(12) United States Patent
Amponsah

(10) Patent No.: US 10,613,115 B2
(45) Date of Patent: Apr. 7, 2020

(54) MULTIPLE INTEGRATED TIPS SCANNING PROBE MICROSCOPE

(71) Applicant: Xallent, LLC, Ithaca, NY (US)

(72) Inventor: Kwame Amponsah, Ithaca, NY (US)

(73) Assignee: Xallent, LLC, Ithaca, NY (US)

( * ) Notice: Subject to any disclaimer, the term of this patent is extended or adjusted under 35 U.S.C. 154(b) by 0 days.

(21) Appl. No.: 16/219,297

(22) Filed: Dec. 13, 2018

(65) Prior Publication Data
US 2019/0128919 A1    May 2, 2019

Related U.S. Application Data

(62) Division of application No. 15/054,382, filed on Feb. 26, 2016, now abandoned.

(Continued)

(51) Int. Cl.
*G01Q 20/02* (2010.01)
*G01Q 60/04* (2010.01)
(Continued)

(52) U.S. Cl.
CPC .......... *G01Q 20/02* (2013.01); *G01Q 60/04* (2013.01); *G01Q 60/30* (2013.01); *G01Q 70/06* (2013.01);
(Continued)

(58) Field of Classification Search
CPC ...... G01Q 10/00; G01Q 10/065; G01Q 20/00; G01Q 20/02; G01Q 30/00; G01Q 30/02;
(Continued)

(56) References Cited

U.S. PATENT DOCUMENTS

| 4,992,660 A | 2/1991 | Kobayashi |
| 5,148,103 A | 9/1992 | Pasiecznik, Jr. |

(Continued)

FOREIGN PATENT DOCUMENTS

| CN | 1159001 | 9/1997 |
| CN | 1160193 | 9/1997 |

(Continued)

OTHER PUBLICATIONS

Yoomin, Ahn et al. "Si multiprobes integrated with lateral actuators for independent scanning probe applications; AFM Si multiprobes with lateral actuators" Journal of Micromechanics & Microengineering, Institute of Physics Publishing, Bristol, GB, vol. 15, No. 6, Jun. 1, 2005, pp. 1224-1229; doi: 10.1088/0960-1317/15//6/012.

(Continued)

*Primary Examiner* — Jason L McCormack
(74) *Attorney, Agent, or Firm* — Bond, Schoeneck & King, PLLC

(57) ABSTRACT

Device and system for characterizing samples using multiple integrated tips scanning probe microscopy. Multiple Integrated Tips (MiT) probes are comprised of two or more monolithically integrated and movable AFM tips positioned to within nm of each other, enabling unprecedented micro to nanoscale probing functionality in vacuum or ambient conditions. The tip structure is combined with capacitive comb structures offering laserless high-resolution electric-in electric-out actuation and sensing capability and novel integration with a Junction Field Effect Transistor for signal amplification and low-noise operation. This "platform-on-a-chip" approach is a paradigm shift relative to current technology based on single tips functionalized using stacks of supporting gear: lasers, nano-positioners and electronics.

2 Claims, 13 Drawing Sheets

Related U.S. Application Data

(60) Provisional application No. 62/121,174, filed on Feb. 26, 2015.

(51) Int. Cl.
  *G01Q 60/30* (2010.01)
  *G01Q 70/06* (2010.01)
  *G01Q 10/04* (2010.01)
  *G01Q 20/04* (2010.01)
  *G01Q 30/02* (2010.01)

(52) U.S. Cl.
  CPC .......... *G01Q 10/045* (2013.01); *G01Q 20/04* (2013.01); *G01Q 30/025* (2013.01)

(58) Field of Classification Search
  CPC ...... G01Q 30/025; G01Q 30/20; G01Q 60/00; G01Q 60/02; G01Q 60/24; G01Q 60/38
  USPC ... 850/1, 2, 3, 5, 6, 8, 9, 19, 20, 21, 22, 33, 850/40, 52, 53, 55, 56
  See application file for complete search history.

(56) References Cited

U.S. PATENT DOCUMENTS

| | | |
|---|---|---|
| 5,426,302 A | 6/1995 | Marchman et al. |
| 5,436,448 A | 7/1995 | Hosaka et al. |
| 5,666,190 A | 9/1997 | Quate et al. |
| 5,994,698 A | 11/1999 | Kawade et al. |
| 6,078,186 A | 6/2000 | Hembree et al. |
| 7,349,223 B2 | 3/2008 | Haemer et al. |
| 7,397,087 B2 | 7/2008 | Chinthakindi et al. |
| 7,872,482 B2 | 1/2011 | Chong et al. |
| 8,056,402 B2 | 11/2011 | Hecker et al. |
| 8,440,523 B1 | 5/2013 | Guillom et al. |
| 8,575,954 B2 | 11/2013 | Chong et al. |
| 10,048,289 B2 | 8/2018 | Lal et al. |
| 2002/0153583 A1 | 10/2002 | Frazier et al. |
| 2003/0020500 A1 | 1/2003 | Altmann et al. |
| 2004/0004182 A1 | 1/2004 | Kranz et al. |
| 2004/0157350 A1 | 8/2004 | McQuade et al. |
| 2004/0223309 A1 | 11/2004 | Haemer et al. |
| 2006/0027878 A1 | 2/2006 | Chinthakindi et al. |
| 2006/0257286 A1 | 11/2006 | Adams |
| 2007/0234786 A1 | 10/2007 | Moon |
| 2008/0246500 A1 | 10/2008 | Chong et al. |
| 2008/0258059 A1 | 10/2008 | Saito |
| 2008/0309688 A1* | 12/2008 | Haaheim ............... G03F 7/0002 346/140.1 |
| 2009/0001488 A1 | 1/2009 | Magana et al. |
| 2009/0114000 A1 | 5/2009 | Hecker et al. |
| 2010/0071098 A1 | 3/2010 | Mirkin et al. |
| 2010/0115671 A1 | 5/2010 | Pryadkin et al. |
| 2010/0154085 A1 | 6/2010 | Maruyama et al. |
| 2010/0205698 A1 | 8/2010 | Faucher et al. |
| 2010/0229265 A1 | 9/2010 | Jin et al. |
| 2010/0244867 A1 | 9/2010 | Chong et al. |
| 2010/0257643 A1 | 10/2010 | Reifenberger et al. |
| 2010/0263098 A1 | 10/2010 | Müller et al. |
| 2011/0055982 A1 | 3/2011 | Watanabe et al. |
| 2011/0115671 A1 | 5/2011 | Sweet, III et al. |
| 2011/0126329 A1 | 5/2011 | Despont et al. |
| 2013/0249584 A1 | 9/2013 | Lou et al. |
| 2014/0331367 A1 | 11/2014 | Lal et al. |
| 2018/0149673 A1 | 5/2018 | Huo et al. |

FOREIGN PATENT DOCUMENTS

| | | |
|---|---|---|
| CN | 2465175 | 12/2001 |
| CN | 2488061 | 4/2002 |
| CN | 1416523 | 5/2003 |
| CN | 101920338 | 12/2010 |
| CN | 103235158 | 8/2013 |
| CN | 104087505 | 10/2014 |
| CN | 104105655 | 10/2014 |
| EP | 1085327 | 3/2001 |
| JP | H07120482 | 5/1995 |
| JP | 2005507175 | 3/2005 |
| JP | 2005300177 | 10/2005 |
| JP | 2010526284 | 7/2010 |
| JP | 4685309 | 5/2011 |
| KR | 20090128186 | 12/2009 |
| WO | 0120347 | 3/2001 |
| WO | 03019238 | 3/2003 |
| WO | 2011159351 | 12/2011 |
| WO | 2013090887 | 6/2013 |
| WO | 2014041677 | 3/2014 |
| WO | 2014114860 | 7/2014 |

OTHER PUBLICATIONS

Ming-Dou Ker, et al., "Fully Process-Compatible Layout Design on Bond Pad to Improve Wire Bond Reliability in CMOS ICs", IEEE Transaction on Components and Packaging Technologies, IEEE Service Center, Piscataway, NJ, US, Vo. 25, No. 2, Jun. 1, 2002 (Jun. 1, 2002), pp. 309-316, XP011070771, ISSN: 1521-3331; figures 1-7.

Koester, S. J. et al. "Wafer-level 3D integration technology", IBM Journal of Research and Development, International Business Machines Corporation, New York, NY, US, vol. 52, No. 6, Nov. 1, 2008 (Nov. 1, 2008), XP002676160, ISSN: 0018-8646, DOI: 10.1147/JRD.2008.5388565, pp. 583-597.

Song, Z.G. et al., "Front-end processing defect localization by contact-level passive voltage contrast technique and root cause analysis", Physical and Failure Analysis of Integrated Circuits, 2002, IPFA 2002, proceedings of the 9th International Symposium on the Jul. 8-12, 2002, Piscataway, NJ, USA, IEEE, Jul. 8, 2002 (Jul. 8, 2002), XP010597768, ISBM: 978-0-7803-7416-4, pp. 97-100.

Notice of Preliminary Rejection, Japanese Patent Application No. 2017563507, dated Nov. 21, 2018.

Notice of Preliminary Rejection, Korean Patent Application No. 10-2017-7026596, pp. 1-7, dated Jul. 31, 2018.

International Search Report and the Written Opinion of the International Searching Authority, International Application No. PCT/US2016/019763, pp. 1-16, dated Sep. 1, 2016.

International Preliminary Report on Patentability, International Application No. PCT/US2016/019763, pp. 1-11, dated Aug. 29, 2017.

\* cited by examiner

MULTIPLE INTEGRATED TIPS SCANNING PROBE MICROSCOPE

CROSS-REFERENCE TO RELATED APPLICATIONS

This application is a Divisional Continuation Application of U.S. patent application Ser. No. 15/054,382 filed on Feb. 26, 2016, which application claims priority to U.S. Provisional Patent Application Ser. No. 62/121,174, filed on Feb. 26, 2015 and entitled "Multiple Integrated Tip Scanning Probe Microscope," which applications are incorporated herein in their entireties.

FIELD OF THE INVENTION

The present disclosure is directed generally to a multiple integrated tips scanning probe microscope for the characterization of thin films and devices.

BACKGROUND

Single-tip Scanning Probe Microscopes (SPM), such as the Scanning Tunneling Microscope (STM) and Atomic Force Microscope (AFM), are critical tools for the investigation of structural and electronic properties of thin film materials and devices. For example, these single-tip SPMs form one or more images of a thin film material or device using a physical probe that scans the target.

However, single-tip SPMs are limited to static measurements such as the local density of states and near-sample surface effects. As a result, a range of fundamental phenomena that exist in thin film materials and devices are inaccessible. As just one example, the effects of dislocations and grain boundaries in thin films cannot be characterized, as the ability to perform trans-conductance (conduction between two tips) measurements at the nanoscale is a critical gap. Trans-conductance would enable a richer understanding of how electrons transport and interact with their surroundings by offering insight into the local density of states, tip-sample coupling, transport mechanisms, scattering phase shifts and inelastic free mean paths of electrons.

Multiple-tips SPMs have been proposed as a way of overcoming the inherent limitations of the single-tip SPM. However, there have been significant challenges to engineering a suitable multiple-tips SPM. Previous approaches to a multiple-tips SPM have relied on independent macroscopically-fabricated probes. These platforms are complex, difficult to actuate, and have limited scale-down. They are also prohibitively expensive to manufacture.

Accordingly, there is a continued need in the art for multiple-tips SPMs that are both cost-effective and easily manufactured and functionalized to the specific investigation for which they will be utilized.

SUMMARY OF THE INVENTION

The present disclosure is directed to a multiple integrated tips (MiT) scanning probe microscope for the characterization of thin films and devices. The MiT scanning probe microscope is a platform that integrates mechanical and electrical functionality in a monolithically-fabricated nanostructure which is tailored and functionalized to the specific investigation. The MiT probe provides two or more monolithically integrated cantilever tips that can be placed within nanometers of each other, with monolithically integrated capacitive actuators, sensors, and transistors to amplify signals. As a result, the MiT SPM is able to perform atomic force microscopy without the need for laser tip alignment. Further, the MiT SPM is capable of nanoprobing surfaces where at least two of the integrated tips are in direct contact or in close proximity with the sample.

According to an aspect is a scanning probe adapter comprising a probe head having at least one probe tip; and an optical microscope configured to view the probe head in relation to a sample.

According to an embodiment, the probe head is mounted on a stage configured to align the at least one probe tip relative to a sample.

According to an embodiment, the probe head is mounted above a piezoelectric sample stage configured to move the sample in at least two axes and further configured to move the sample past the probe for scanning.

According to an embodiment, the piezoelectric stage is mounted onto a rotating stage configured to orient the sample in a particular direction.

According to an embodiment, the stage is mounted onto: (i) a first stage configured to move the stage along a first, X axis; (ii) a second stage configured to move the stage along a second, Y axis; and (iii) a third stage configured to move the stage along a third, Z axis.

According to an embodiment, the probe head comprises a top component and a bottom component.

According to an embodiment, a probe comprising the probe tips is affixed to the probe head.

According to an embodiment, a probe comprising the probe tips is affixed to a board component, and the board component is affixed to the probe head.

According to an embodiment, the top component houses at least one transimpedance amplifier.

According to an embodiment, the top component probe head houses at least one spring loaded pogo pin, wherein the spring loaded pogo pin is configured to push against and make electrical contact to a board component or probe comprising the probe tips.

According to an aspect is method of attaching a scanning probe adapter to a scanning probe microscope. The method includes the steps of: (i) removing an existing probe head of the scanning probe microscope; and (ii) mounting the scanning probe adapter above a sample stage of the scanning probe microscope.

According to an aspect is a method of attaching a scanning probe adapter to a three-dimensional microscope. The method includes the steps of: (i) placing a sample stage under the three-dimensional microscope, wherein the sample stage is configured to move the sample in at least two axes; and (ii) mounting the scanning probe adapter relative to the sample stage.

According to an embodiment, the three-dimensional microscope is an optical microscope, a scanning electron microscope, or a transmission electron microscope.

According to an aspect is a method of operating a scanning probe microscope. The method includes the steps of: (i) providing a probe with at least one tip, the probe comprising at least one monolithically integrated actuator and sensor, wherein the monolithically integrated actuator is configured to actuate and oscillate the probe tip; and (ii) measuring, using the monolithically integrated sensor, a motion of the oscillating probe tip.

According to an embodiment, the at least one monolithically integrated actuator and sensor is capacitive, piezoelectric, piezoresistive, or a combination of capacitive, piezoelectric, and piezoresistive.

According to an aspect is a method of aligning at least two probe tips in a scanning probe adapter. The method includes the steps of: (i) providing a probe head comprising at least two probe tips; (ii) biasing the sample and the at least two probe tips with either an AC or DC signal; (iii) moving, using a sample stage, the sample and the at least two probe tips into proximity; (iv) measuring a current from each of the at least two probe tips; (v) comparing the measured currents to determine which, if any, of the at least two probe tips generated a higher current; and (vi) if one of the at least two probe tips generated a higher current, retracting the sample stage and rotating the probe head away from whichever of the at least two probe tips generated the highest current, or determining that the at least two probe tips are aligned if equivalent currents are measured from the at least two probe tips.

According to an embodiment, the method further includes the step of repeating the method until equivalent currents are measured from the at least two probe tips.

According to an aspect is a method of aligning at least two probe tips in a scanning probe adapter. The method includes the steps of: (i) providing a probe head comprising at least two probe tips; (ii) moving the sample and the at least two probe tips into proximity; (iii) capturing, using an optical microscope, an image of the at least two probe tips and a corresponding reflection of the at least two probe tips; (iv) tracking, using an image recognition algorithm, an outer line shape of the at least two probe tips and the corresponding reflections; (v) calculating a distance between an apex each of the at least two probe tips and the apex of the corresponding reflection; (vi) comparing the calculated distances to determine which, if any, of the at least two probe tips had a shorter calculated distance; and (vii) if one of the at least two probe tips had a shorter calculated distance, rotating the probe head away from whichever of the at least two probe tips had the shorter calculated distance, or determining that the at least two probe tips are aligned if equivalent distances are calculated for each of the at least two probe tips.

According to an embodiment, the method further includes the step of repeating the method until equivalent distances are calculated from the at least two probe tips.

According to an aspect is a method for characterizing a sample using a scanning probe adapter. The method includes the steps of: (i) providing a probe head comprising at least two probe tips; (ii) aligning the at least two probe tips; (iii) scanning the sample with at least one of the at least two probe tips to obtain a first measurement; and (iv) performing at least one of storing the obtained first measurement, transmitting the obtained first measurement, and displaying the obtained first measurement.

According to an embodiment, the method further includes the step of contacting the sample with at least one of the at least two probe tips to obtain a second measurement.

According to an embodiment, the second measurement is an electrical measurement, a mechanical measurement, an optical measurement, or a chemical measurement.

These and other aspects of the invention will be apparent from the embodiment(s) described hereinafter.

BRIEF DESCRIPTION OF THE DRAWINGS

The present invention will be more fully understood and appreciated by reading the following Detailed Description in conjunction with the accompanying drawings, in which.

DETAILED DESCRIPTION OF EMBODIMENTS

The present disclosure describes various embodiments of a multiple integrated tips scanning probe microscope for the characterization of thin films and devices. The MiT-SPM enables nanoscale atomic imaging, as well as electrical probing of trans-conductance, in ambient air without requiring a scanning electron microscope. The device provides for detailed studies of transport mechanisms in thin film materials and devices.

Figure 1:
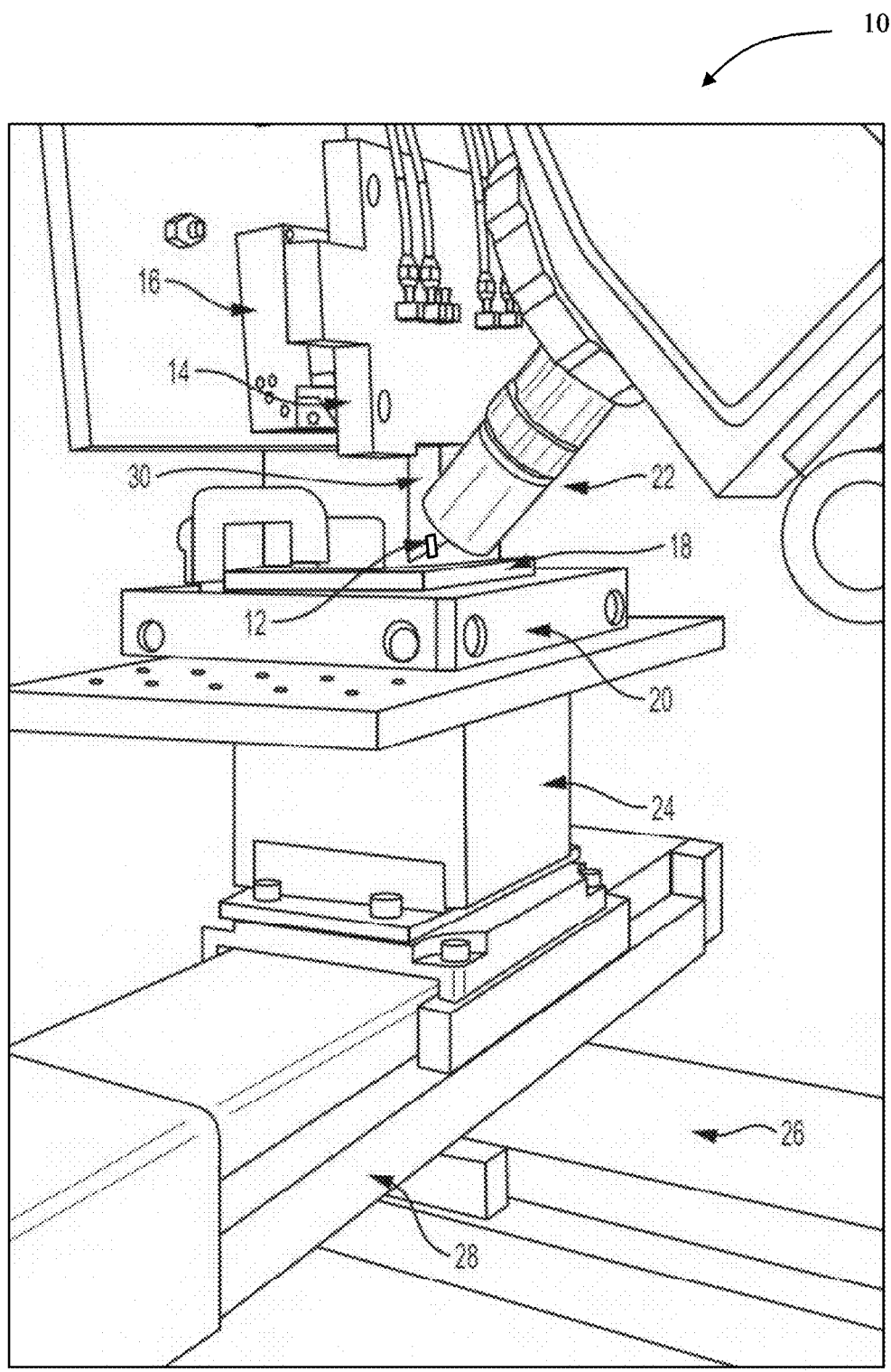
FIG. 1 is an image of a multiple integrated tips scanning probe microscope system, in accordance with an embodiment.

Referring now to the drawings, wherein like reference numerals refer to like parts throughout, there is seen in FIG. 1, in one embodiment, a multiple integrated tip scanning probe microscope system 10. The MiT-SPM system includes the MiT probe 12, which can be wire-bonded to a printed circuit board (PCB) 30. The MiT-SPM also includes a scanning probe head 14, which houses the transduction electronics including the transimpedance amplifier (TIA) which converts the tunneling current into voltage, as discussed in greater detail below. A rotating stage 16 aligns the MiT probe 12 to the surface of the sample 18, which is mounted on an SPM stage 20. MiT-SPM system 10 also includes an optical microscope 22, which is utilized for coarse approach visualization of the sample in relation to the MiT probe tips. The system also includes a series of stages to allow long-range movement in the X, Y, and Z axes, including the X-translation stage 26, the Y-translation stage 28, and the Z-translation stage 24. According to an embodiment, a software algorithm is utilized to control the probe head and stages during use, as discussed in greater detail below.

Figure 2:
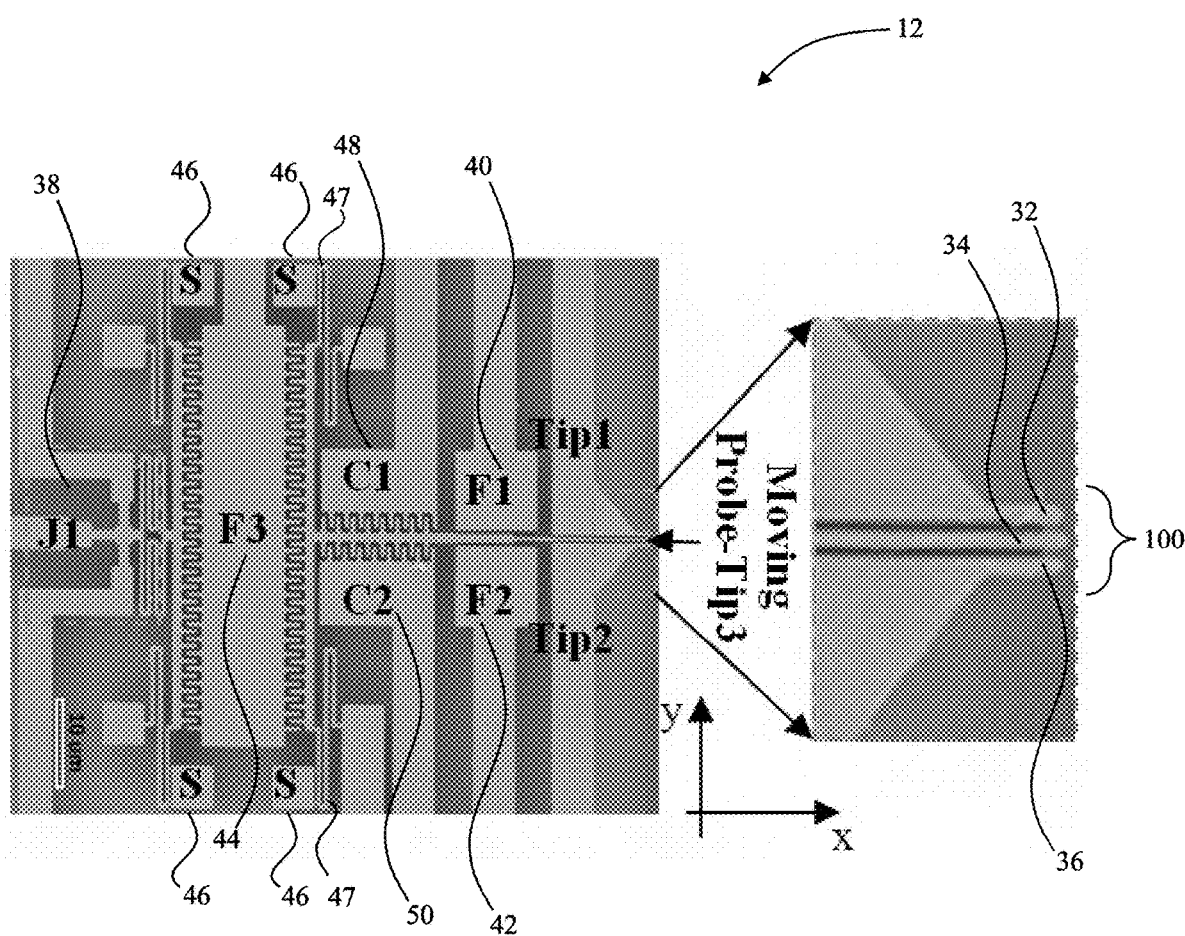
FIG. 2 is a top view image of an MiT probe, in accordance with an embodiment.

Referring now to FIG. 2, in one embodiment, a top view of the MiT probe 12 is provided. According to an embodiment three MiT tips 32, 34, and 36 in tip region 100 of the MiT probe can be co-fabricated, although they could also be assembled after production. The center tip 34 is allowed to move relative to the two fixed outer tips using one or more actuators, including but not limited to the actuators depicted in FIG. 2. These actuators cause center tip 34 to be displaced relative to the outer tips 32 and 36.

According to an embodiment, center tip 34 can be displaced approximately 200 nm in both the longitudinal and lateral directions within the plane of the wafer, and this motion is sensed through detection component. Among other possible detection elements, the detection component may be a capacitively-coupled junction gate field-effect transistor (JFET) preamplifier (J1) 38. According to another embodiment of the detection component, electrodes C1 48 and C2 50 can serve as differential capacitors which can be used to measure the displacement of the middle tip.

According to an embodiment, center tip 34 may be actuated along the y-axis using the electrostatic plate actuators F1 and F2, denoted by numerals 40 and 42. The actuators can function cooperatively, for example, to displace the movable probe tip 34. Center tip 34 can be moved along the x-axis using the electrostatic forces between actuator F3, denoted by numeral 44, and center tip 34. FIG. 2 also shows the stoppers (S) 46 and springs 47, which restrict motion of center tip 34 and JFET 38. Springs 47 are operationally connected to at least one of the probe tips, e.g., center tip 34.

According to an embodiment, MiT-SPM can operate in at least three main modes to obtain data about a sample, as well as a combination of these modes. The three main modes are nanoprobing, AFM, and STM, discussed in greater detail below. However, it should be noted that the MiT-SPM can operate in modes other than those specifically described herein.

Nanoprobing Mode

Figure 3A:
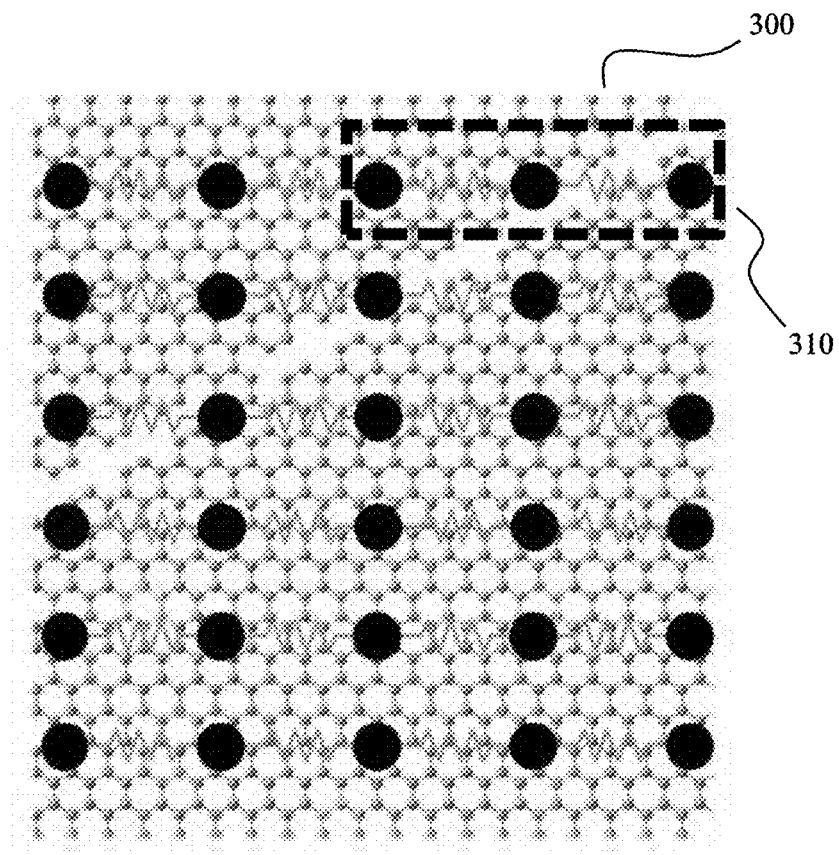
FIG. 3A is a schematic representation of a resistance map of a thin film, in accordance with an embodiment.
Figure 3B:
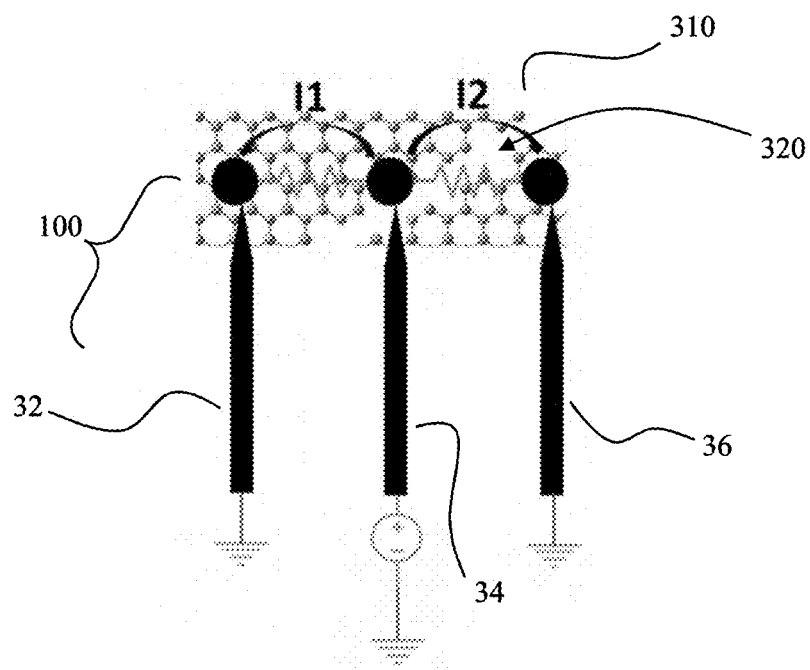
FIG. 3B is a schematic representation of an MiT-SPM scanning the thin film of FIG. 3A, in accordance with an embodiment

Nanoprobing mode can be used to identify opens, shorts, and grain boundaries in thin film, among other possible uses. Referring to FIG. 3A is an illustration of the resistance map of a thin film 300, with a unit cell shown by the dashed box 310. Region 310 of the thin film 300 is also shown in FIG. 3B, together with the tip region 100 of an MiT probe 12. Referring to FIG. 3B, voltage is applied to center tip 34, with the side tips 32 and 36 grounded. Measured currents between the tips give conductance information of a particular region. Since there is an "open" region 320 in the thin film between the center tip 34 and side tip 36, there will be negligible amount of current 12 and, as such, a high resistance. The detection system will recognize and interpret this high resistance. The nanoprobing mode can also be used to measure the device performance of three-dimensional structures such as planar transistors and FinFETs, among many others.

According to an embodiment, in nanoprobing mode the MiT probe is preferably aligned perpendicular to the sample surface to ensure that both side tips of the MiT probe are in contact with the sample. An example of an alignment protocol is illustrated in FIG. 4.

Figure 4:
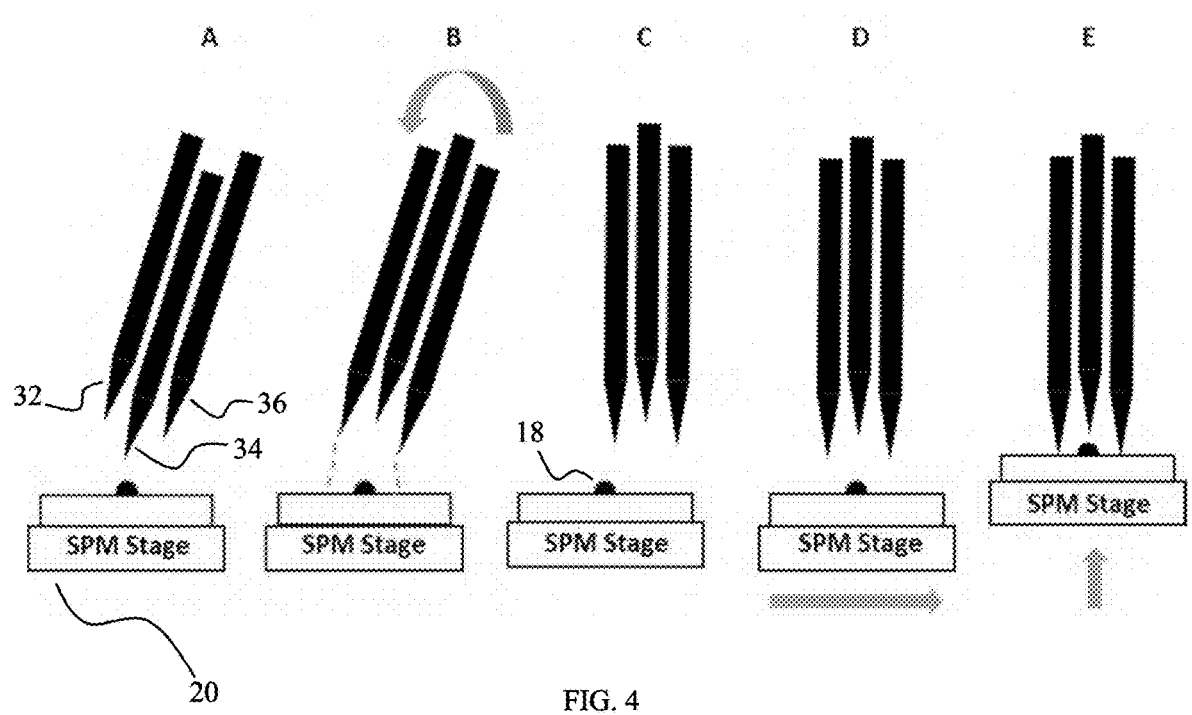
FIG. 4 is a schematic representation of an MiT probe alignment protocol in nanoprobing mode, in accordance with an embodiment.

In step 4A of FIG. 4, the SPM stage 20 is biased and the MiT probe approaches the sample 18 at any angle. Although a specific angle is depicted in FIG. 4, the actual angle can be any angle. In step 4B, center tip 34 is electrostatically retracted by applying voltage to electrode F3 (shown in FIG. 2). The side tips of the MiT probe are grounded and a voltage is applied to the sample. As the sample approaches the tips, electrons tunnel from the side tips 32 and 36 to the sample 18 or vice versa.

Figure 5:
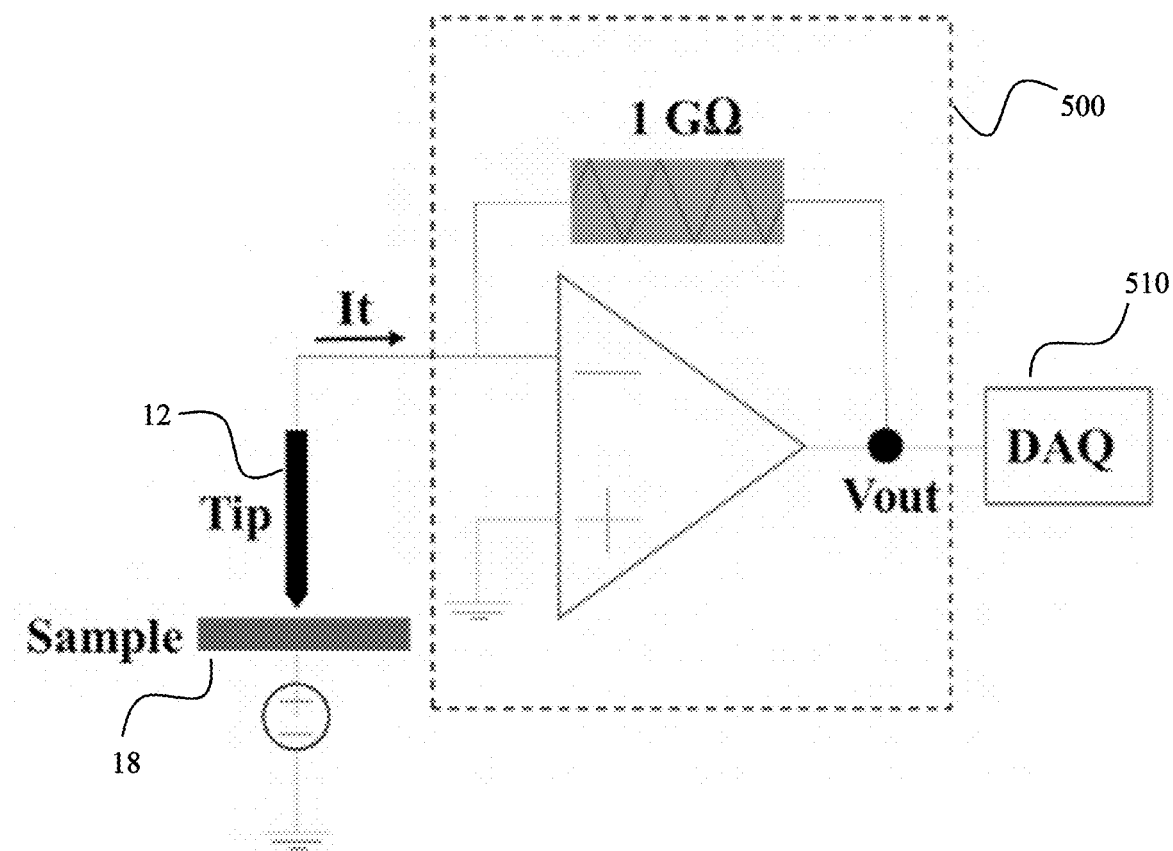
FIG. 5 is a schematic depiction of a tunneling current (It) converted into a voltage and fed to a Data Acquisition system (DAQ), in accordance with an embodiment.

Referring to FIG. 5, in one embodiment, the tunneling current (It) from the MiT probe 12 is converted into a tunneling voltage by an onboard transimpedance amplifier (TIA) 500. The output of the TIA 500 is connected to a data acquisition (DAQ) system 510 and sampled, such as at a rate of 2 kHz although other rates are possible. The sampled voltages undergo signal processing by first being filtered with a bandstop filter that removes noise, such as 60 Hz noise in this example, and then their mean voltage values are evaluated. The mean voltage values from Tip 1 and Tip 2 are then put into the "control box" which implements the state machine illustrated in TABLE 1.

TABLE 1

State machine for the alignment of side tips 32 and 36.

| Tip 1 | Tip 2 | Output | Instruction |
|---|---|---|---|
| 0 | 0 | No tunneling | Move Z-piezo until tunneling |
| 0 | 1 | Tunneling from Tip 2 | Retract Z-piezo and rotate CW, XY lateral translation |
| 1 | 0 | Tunneling from Tip 1 | Retract Z-piezo and rotate CCW, XY lateral translation |
| 1 | 1 | Tunneling from both tips | Tips are aligned, perform measurements |

According to an embodiment, with 1 V applied to the sample, a tunneling current of about 1 nA is expected assuming the tip-sample spacing is ~1 nm with an impedance of 1 G. This tunneling current is converted by the 1 GΩ feedback resistor in the TIA 500 to generate an output voltage of 1 V. A tolerance of 0.1 V is set such that if the tunneling voltage is 10% away from the setpoint (1 V), the tip is considered to be in the tunneling regime. Relying on TABLE 1, when there is no tunneling current sensed, the Z-piezo moves 4 nm where the DAQ then samples the tunneling current from both tips. If there is no tunneling current, the Z-piezo continues to move 4 nm until tunneling current is sensed from either side tip or both tips. If current is sensed at one of the side tips, the Z-piezo retracts and the MiT Scanning Probe head (which contains MiT probe and electronics) rotates clockwise (CW) or counterclockwise (CCW) away from the tip that generated the tunneling current.

In step 4C of the alignment protocol depicted in FIG. 4, rotation places center tip 34 at a different location relative to its original position in step A. In step 4D of the protocol, X- and Y-lateral translation of the sample stage is carried out to position the sample to the original location. The Z-piezo movement, rotation and lateral translation is reiterated until equivalent currents are sensed from both tips, indicating a successful tip-alignment.

And in step 4E of the protocol, in order to have suitable sample-tip contact, the Z-piezo is further moved-in an extra 10 nm before electrical characterization is carried out. To preserve the integrity of the sharpness of the middle tip, the middle tip can stay retracted and the side tips used for nanoprobing. Once the MiT probe is in soft contact with the sample, the sample bias is turned off and the sample stage is electrically floated through a relay that is connected to the SPM stage. Current-Voltage (IV) measurements are conducted by grounding one of the side tips and applying voltage ramps to the other. The alignment and nanoprobing routines are repeated for each spot in a conductance map.

Figure 6:
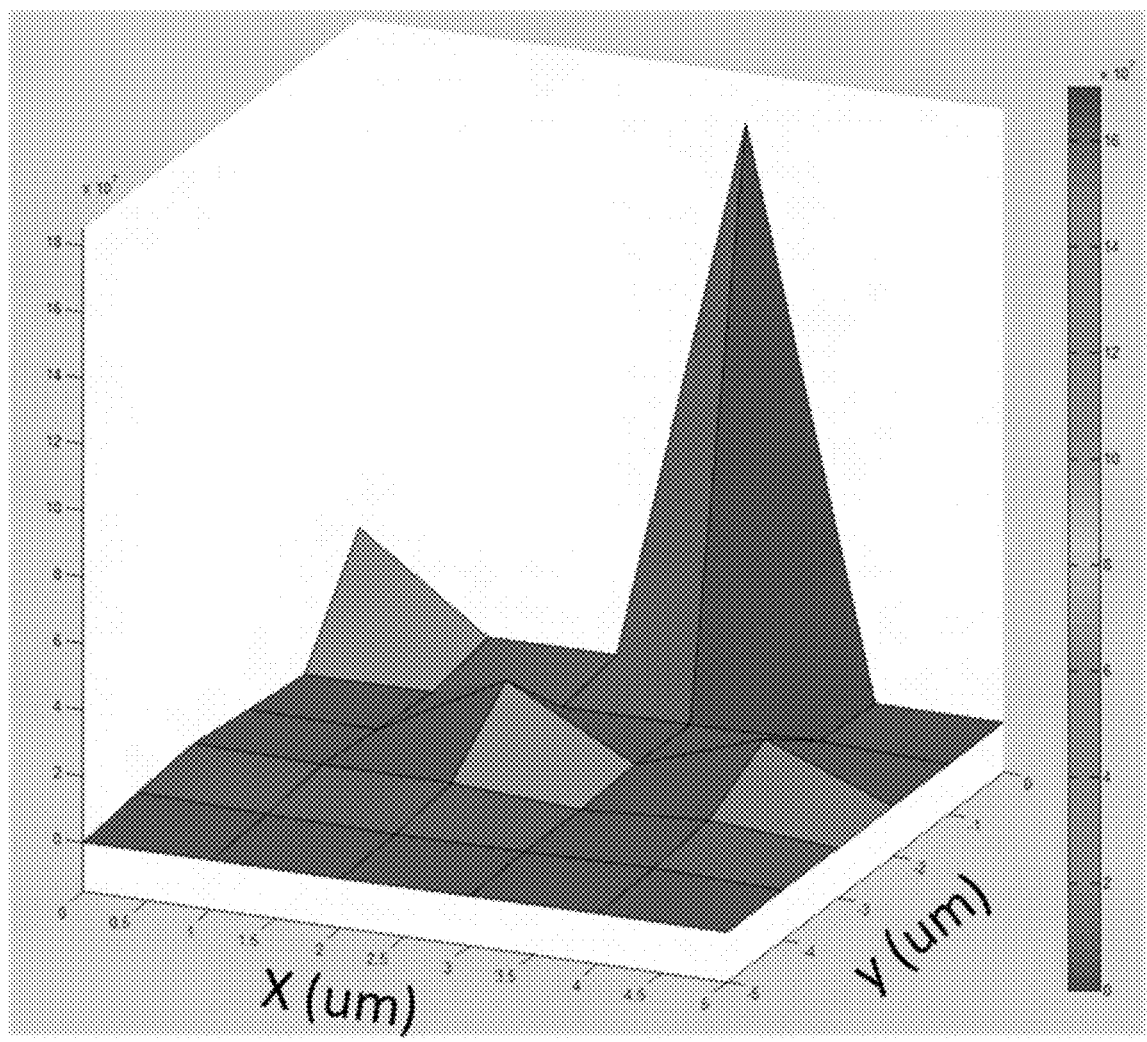
FIG. 6 is a graph of a 5 µm by 5 µm resistance map of HOPG film created by an MiT probe in nanoprobing mode, in accordance with an embodiment.

As shown in FIG. 6, the MiT probe in nanoprobing mode was used to map the resistance of HOPG film, where the measured resistance values range from 7 k$\Omega$ for continuous regions and 170 M$\Omega$ for non-continuous regions.

Figure 7:
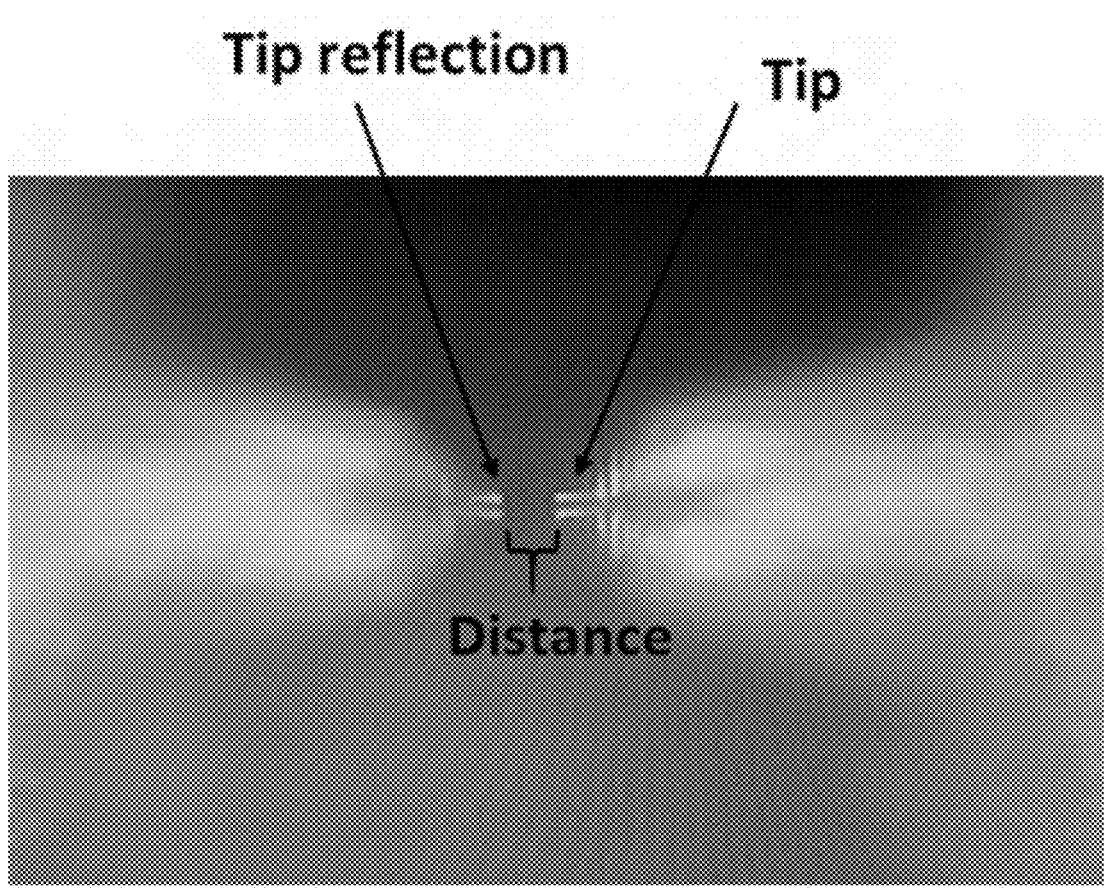
FIG. 7 is an optical image of the tips of an MiT probe and their corresponding reflections, in accordance with an embodiment.

Another way of aligning the side tips is via an optical technique where the tips are brought into close proximity with a sample surface and an optical image is periodically captured of the tips and their reflected images as shown in FIG. 7. At each Z-piezo movement, an optical image is captured and processed. From the acquired image, the number of pixels between each tip and its reflected image is calculated. A software algorithm is used to calculate the distance (pixels) between each tip and its reflected image. The MiT probe is retracted and rotated away from the tip with the shortest tip-sample distance. The Z-piezo movement and rotation is reiterated until there is equivalent distance between each tip and the sample.

In nanoprobing mode, a low tip-sample contact resistance is crucial for achieving good electrical response. According to an embodiment, when a probe contacts a substrate, the contact resistance can be modeled using the following equation:

$$R_c = \frac{\rho_{probe} + \rho_{substrate}}{4na} + \frac{\sigma_{oxide-film}}{A_{contact}} \quad \text{(Eq. 1)}$$

where $\rho_{probe}$ and $\rho_{substrate}$ represent the resistivity of the probe and substrate respectively, n is the number of asperities and "a" is the diameter of the probe tip. If the contact area ($A_{contact}$) has an oxide thin film resistance ($\sigma_{oxide-film}$), this would increase the contact resistance. The workfunctions of the probe and substrate have to been chosen carefully in order to avoid making Schottky contact. All metal MiT probe have been fabricated. Also, different metal can be sputtered onto the MiT probe to change its workfunction.

According to an embodiment, an algorithm is utilized to control the MiT-SPM. For example, the software can be developed in a variety of software suites, including but not limited to LabVIEW. The algorithm may include control, thresholds, or settings for, among other things, movement of the sample stage, tunneling, voltage, current, and others. The algorithm may also include one or more outputs for the user to visualize a graphical representation of the resistance map, topography, as well as monitor current and voltage measurements. Many other settings and outputs are possible.

According to an embodiment, the MiT probe and MiT-SPM can be used to investigate the various charge transport transitions from localize to diffusive to ballistic transport in thin films. Being able to capture these transitions will provide a deeper understanding of the conductivity of thin films. However, tunability of spacing is necessary to enable these investigations. Ballistic transport occurs when the distance between the two probes is less than both the momentum relaxation length and the phase relaxation length. There is no scattering and when the Fermi wavelength is comparable to the spacing, quantized conductance occurs. In the case the spacing is greater than the momentum relaxation length, there is scattering and reduced transmission and this regime is diffusive. In localize transport regime, the spacing is greater than both the phase relaxation length and momentum relaxation length.

Figures 8A, 8B, 8C:
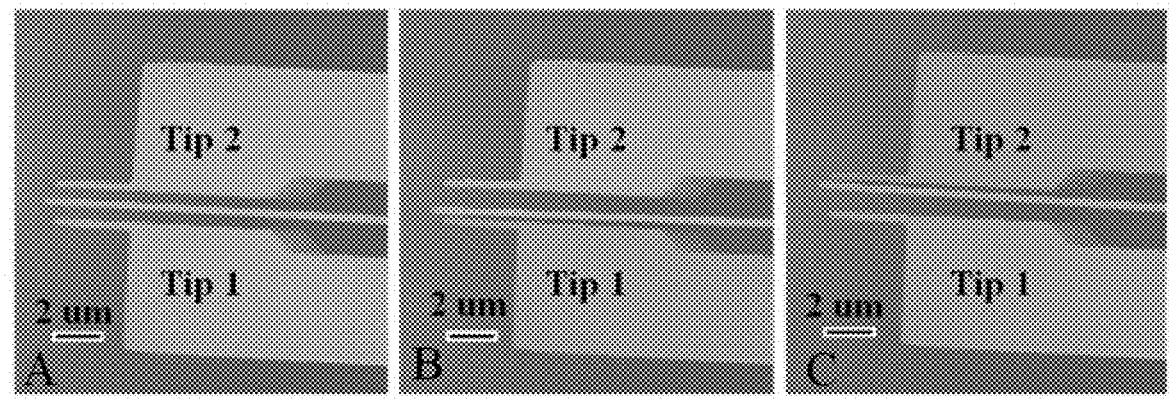
FIG. 8A is an image of the actuation of a MiT probe with all the tips grounded, in accordance with an embodiment.
FIG. 8B is an image of the actuation of a grounded center tip of an MiT probe with voltages applied to the side tips, in accordance with an embodiment.
FIG. 8C is an image of the actuation of a grounded center tip of an MiT probe with voltages applied to the side tips, in accordance with an embodiment.

The spacing between the middle tip and either of the side tips can be reduced by applying voltage ramps to either electrode F1 or F2. Also applying voltages to Tip 1 and Tip 2 would laterally deflect the middle tip. Referring to FIGS. 8A-8C is the actuation of center tip 34 with voltages applied to the side tips while the middle tip is grounded. By modulating the gap, transport phenomena such as transitions from localized, diffusive and ballistic transport can be investigated. In FIG. 8A, all the tips are grounded, while in FIG. 8B a +3.5 V is applied to Tip 1, and in FIG. 8C a +3.5 V is applied to Tip 2.

STM Mode

When a conducting tip is brought into close proximity (<1 nm) to a conducting sample and a potential difference is applied between the tip and the sample, electrons tunnel from the tip to the sample or vice versa. The measured tunneling current can give information about workfunction differences, density of states and also by scanning the tip across the sample, topography and atomic information can be acquired. The conventional STM uses a single tip, but MiT-SPM uses multiple integrated tips which have to be aligned perpendicular to the sample surface to avoid the side tips from scratching the sample. The alignment protocol for the STM mode is the same approach as used in the nanoprobing mode and described in reference to FIG. 4. After the tips are aligned, the DC biased on F3 is removed and the middle tip of the MiT probe is extended and used for STM imaging.

Figure 9:
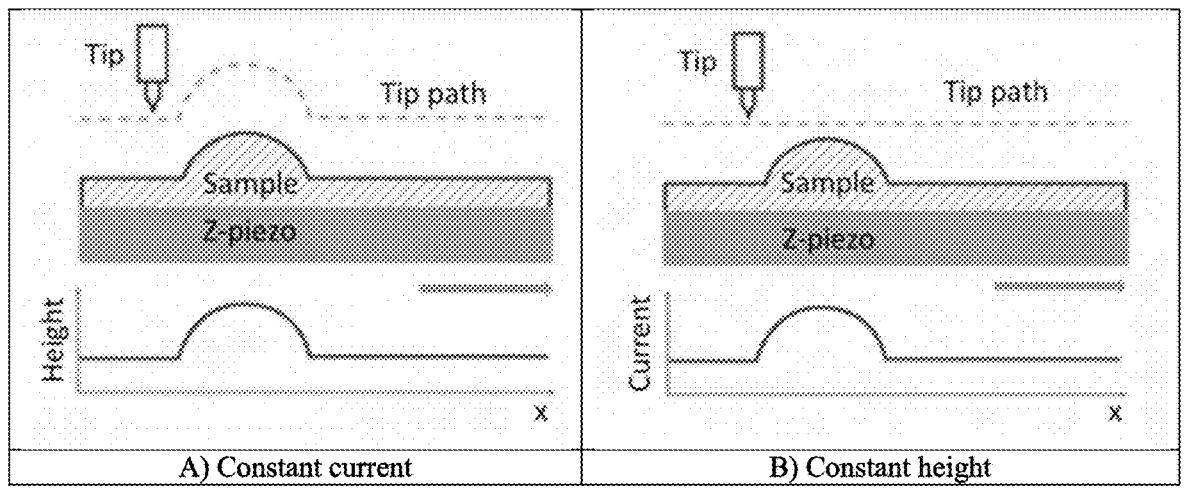
FIG. 9 is a schematic representation of an MiT probe in STM mode, in accordance with an embodiment.

According to an embodiment, the STM mode of operation is either the constant current or constant height modes. In constant current mode, the tip will track the topography of the sample surface with the help of a Proportional-Integral-Differential (PID) feedback controller. According to an embodiment, the PID controller is implemented in software. In constant height mode, there is no Z-piezo movement during the imaging of the sample as shown in FIG. 9, which shows the STM in both constant current and constant height modes.

According to an embodiment, the same hardware that was used for the nanoprobing mode can be used for the STM mode. Stability of the entire MiT-SPM system is crucial to achieving atomic imaging of thin films. The SPM is susceptible to various sources of drift or instability, as described in greater detail below.

The suspended MiT probe can be susceptible to fundamental Brownian noise displacement. In order to achieve atomic imaging, the Brownian noise displacement must be orders of magnitude lower than the interatomic distance of the thin film. The Brownian noise displacement can be evaluated using the following equation:

$$\bar{x} = \sqrt{\frac{4k_B T b}{k^2} \left\{ \frac{1}{\left[1 - \left(\frac{\omega}{\omega_o}\right)^2\right]^2 + \frac{\omega^2}{(Q\omega_o)^2}} \right\}} \ m/\sqrt{Hz} \quad \text{(Eq. 2)}$$

where $k_B$ is the Boltzmann constant (1.38066×10$^{-23}$ J/K), T is the temperature (300 K), b is the damping coefficient (1.31×10$^{-7}$ N s/m), k is the spring constant (2.56 N/m), $\omega_o$ is the measured resonance frequency (1.95×10$^6$ rad/s) and Q is the quality factor (~10). At resonance, the Brownian noise force is expected to be 46.6×10$^{-15}$ N/Hz and the mean noise displacement $1.82 \times 10^{-13}$ m/$\sqrt{Hz}$. Assuming the bandwidth of measurement of 100 Hz, the displacement of the probe tip by Brownian noise will be 1.8 picometers. For example, this Brownian noise displacement of the tip is two orders of magnitude lower than the interatomic distance of HOPG providing sufficient SNR for lateral measurement. Thus, drift from the MiT probe is negligible.

Aging of the tips during continuous nanoprobing will change the probe contact resistance. Depending on the measurement, a threshold contact resistance is set and routinely monitored and if the contact resistance exceeds this value the tip is replaced.

Thermal drift can be a common problem in commercial SPMs. For example, the metals that are used in the assembly of SPMs have a coefficient of thermal expansion. Temperature variations during measurements would generate thermal drift which will cause the position of the tip relative to the sample to drift over tens or even hundreds of nm during the entire scanning process. The end effect would be images that are stretched, skewed or distorted. Some of the techniques commonly used to minimize thermal drift include operating the SPM in a cryostat or scanning very fast (video rate imaging) such that the drift becomes negligible. Because the MiT probe and MiT-SPM may be operated in ambient air and at normal STM/AFM scanning rates, a drift compensating algorithm can be implemented on the acquired images. According to an embodiment, the drift compensation steps could be: (1) Image Acquisition; (2) Drift Velocity Measurements; (3) Parameters for drift model; and (4) Drift compensation, among other steps.

According to an embodiment, lateral drift (x and y) is compensated by tracking the position of a stationary component on a calibration sample over time through consecutive up and down scans and monitoring the location offset. Vertical drift on the other hand is compensated by measuring the height variations at a particular point over time through consecutive up and down scans of that point.

AFM Mode

AFM typically utilizes a single cantilever tip that can be excited by a piezoelectric material attached to the base of the cantilever. The vibrations of the cantilever are measured with a laser that is incidence at the tip of the cantilever and the reflected laser signal is collected onto a quadrature photodetector. Optical transduction (laser-photodetector) is preferred because it offers a better low noise signal transduction, but these laser systems are bulky and expensive. Also, it takes time and experience to align the laser to the tip of the cantilever. The laser beam can also excite electron/hole pairs in the material that is being characterized. Because of these disadvantages of optical transduction, electrical transduction is a viable option.

According to an embodiment, the MiT-SPM does not require lasers for tip alignment. Instead, electrical signals are sent to the MiT probe to actuate the middle probe and this motion is also sensed electrically by using capacitive comb-drives. Capacitive transduction is used due to fabrication simplicity, high sensitivity and low noise performance. When a vibrating AFM tip is brought into close proximity to a sample surface, there exist an atomic force between the tip and the sample. This atomic force acts on the tip to change its vibrational frequency, amplitude and phase. This change in the response of the tip is used to form a topographical image of the sample surface. Whereas STMs require a potential difference between the tip and sample, AFMs do not and can be used to image insulating materials. Since the MiT probe can be made of conducting metal, it can be used in the AFM mode (as a conductive-AFM) to characterize both conducting and insulating materials.

Figure 10:
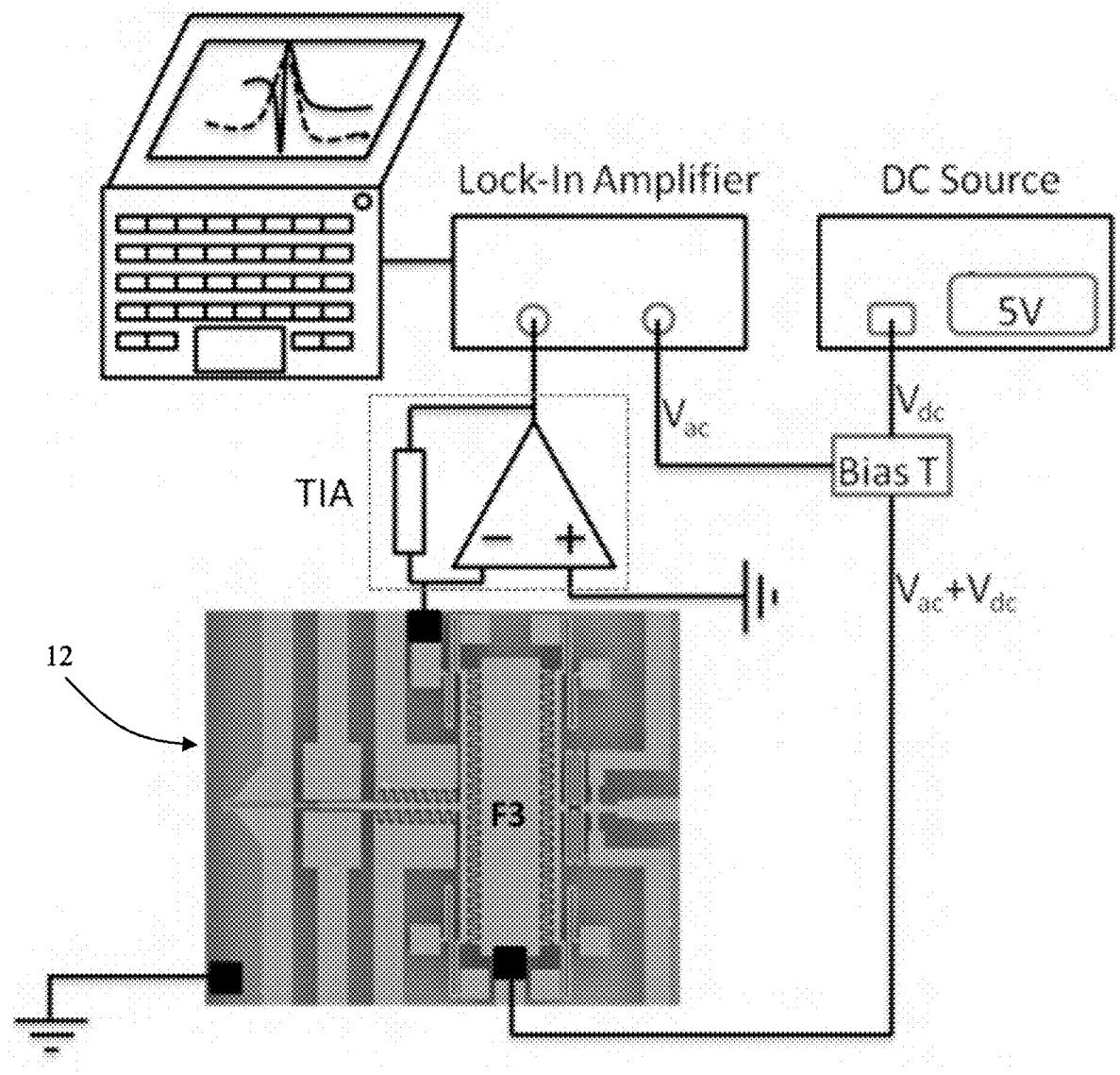
FIG. 10 is a schematic representation of a single-ended configuration in measuring the resonance frequency, amplitude and phase of an MiT probe, in accordance with an embodiment.
Figure 11:
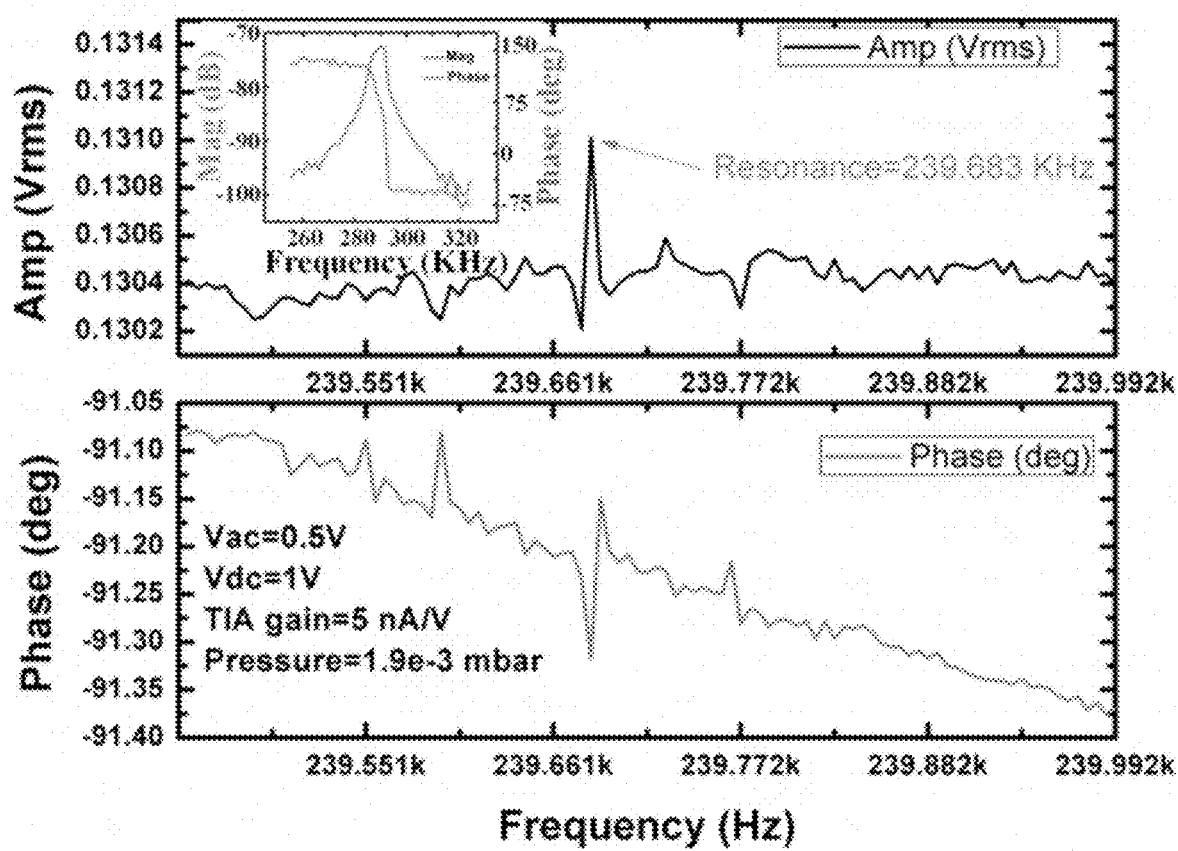
FIG. 11 is a graph of frequency response measurement of a moving tip of an MiT probe in AFM mode, in accordance with an embodiment.

According to an embodiment, in the AFM mode the middle tip 34 is excited in resonance by applying AC signals to electrode F3 and the middle tip is scanned along the sample. Using a setup such as the one depicted in FIG. 10, the resonance frequency, amplitude and phase of the vibrating middle tip can be measured. A lock-in amplifier can be used to create an AC sweep that is combined with DC voltage through a bias-tee and launched on electrode F3. The AC signal will cause the middle tip to vibrate and the displacement current between F3 and middle tip (generated from the vibrations) can be fed into a low noise transimpedance amplifier (TIA) with sensitivity set to 5 nA/V. The output voltage of the TIA is fed back into the lock-in amplifier for demodulation into magnitude and phase. The driving AC frequency is used to demodulate the phase and amplitude of the output signal. FIG. 11 displays the measured frequency response of the middle tip. According to an embodiment, electrodes C1 and C2 can serve as differential capacitors which can be used to measure the displacement of the middle tip.

Figure 12:
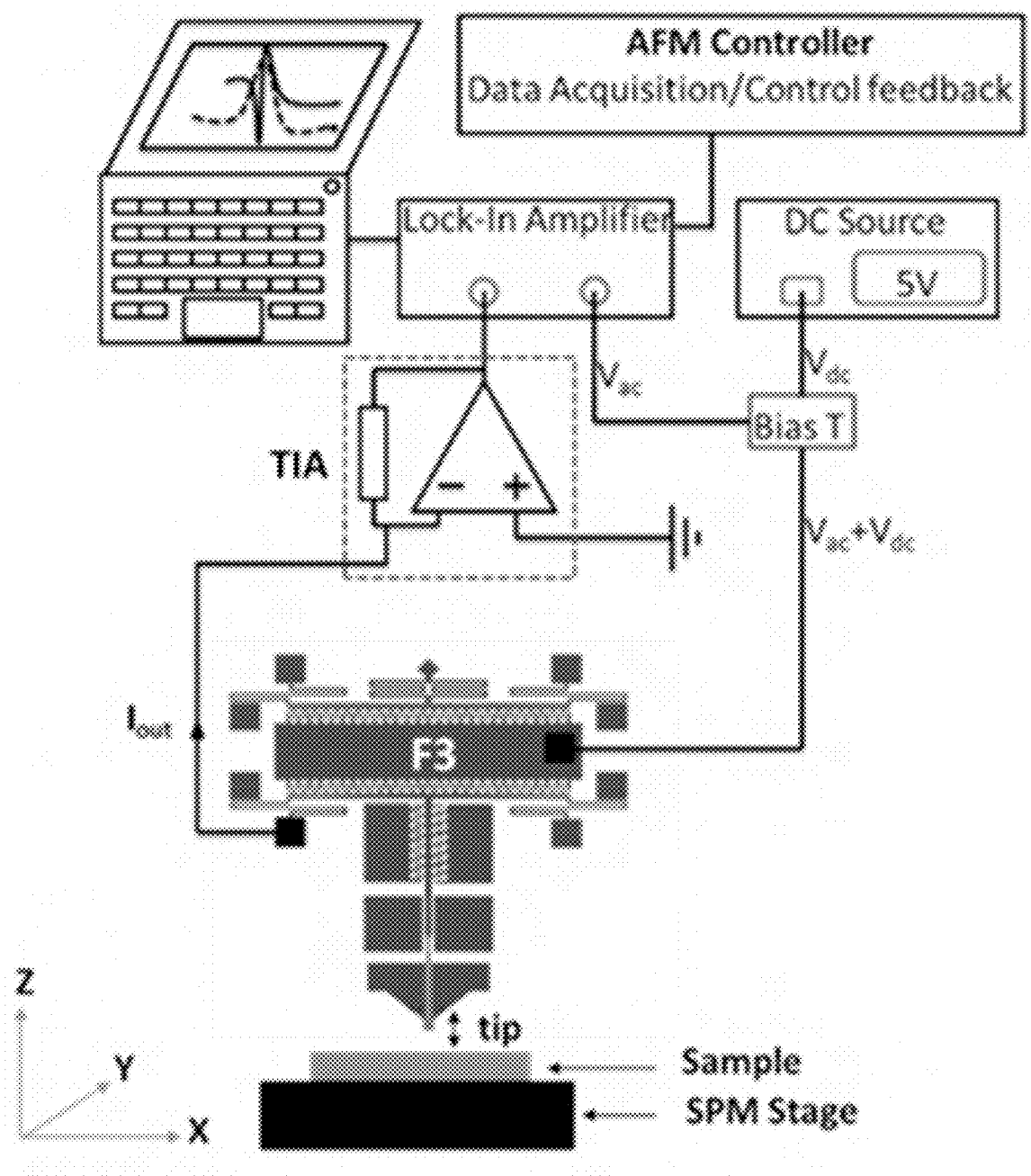
FIG. 12 is a schematic representation of a configuration for an MiT probe in AFM mode, in accordance with an embodiment.

Referring now to FIG. 11 is a graph of frequency response measurement of a moving tip in a vacuum at a pressure of $1.9 \times 10^{-3}$ mbar, in accordance with an embodiment. According to this experimental setup, the resonance frequency of the tip was measured to be 239.7 kHz. Depicted in the inset of FIG. 11 is the optical measurement of the resonance frequency which was 291.5 kHz. The calculated resonance frequency of 310 kHz was in agreement with the optically measured results. The spring constant of the middle tip was 2.56 N/m, indicating that sufficient stiffness is obtained for precision placement and contact force without buckling the tip. This measurement technique can extended to measure and track changes in the resonance frequency, amplitude and phase of the middle tip as it scans a surface. At resonance, the resonance frequency is given by the following equation:

$$f_0 = \frac{1}{2\pi} \sqrt{\frac{k_{eff}}{m}} \quad \text{(Eq. 3)}$$

where F is the electrostatic driving force provided by electrode F3, $k_{eff}$ is the effective spring constant of the middle tip, Q is the quality factor, $\omega_0$ is the fundamental angular resonance frequency, and m is the mass of the middle tip. According to an embodiment, FIG. 12 illustrates a laser-less setup for the AFM mode of operation.

According to an embodiment, the measurement resolution and bandwidth of the AFM is limited by the injection of noise into the MiT probe's output signal. The noise from the printed circuit board 30, the TIA 500 and the lock-in amplifier, for example, can be analyzed. The input noise of the lock-in amplifier would vary with the gain of the TIA. In order to achieve higher signal-to-noise ratio's, the TIA's noise floor and gain will be reduced. Due to the high stiffness of the MiT probe, it is expected that the thermomechanical noise of the probe would be negligible compared to the other noise sources.

Force curves represent the amplitude of vibration of the tip at a given driving frequency as a function of the tip-sample distance. When the tip is in proximity with the sample surface, an interaction force ($f_{ext}$) acts on it. The vibration of the tip can be modeled as a harmonic oscillator, as shown by the following equation:

$$m_{eff}\ddot{z}+\gamma\dot{z}+k_{eff}z=f_{ext}+f\cos(\omega t) \quad \text{(Eq. 4)}$$

where $m_{eff}$ is the effective mass of the vibrating tip, y is the damping factor, $k_{eff}$ is the effective spring constant, $f_{ext}$ is the external force acting on the probe tip and z is the tip displacement. According to equation:

$$\gamma = \frac{\omega_o m_{eff}}{Q} \quad \text{(Eq. 5)}$$

the fundamental angular resonance frequency of the tip is $\omega_0$ and the quality factor is Q. The vibration amplitude is given by equation (6) and the phase is derived in equation (7):

$$A(\omega) = \frac{f}{k_{eff}}\left(\frac{1}{\sqrt{\left(1-\frac{\omega^2}{\omega_0^2}\right)^2 + \frac{1}{Q^2}\frac{\omega^2}{\omega_0^2}}}\right) \quad \text{(Eq. 6)}$$

$$\theta(\omega) = \arctan\left(\frac{\frac{\omega}{\omega_o}}{Q\left(\frac{\omega^2}{\omega_0^2}-1\right)}\right) \quad \text{(Eq. 7)}$$

As the tip approaches the surface, its vibrational amplitude is decreased as its fundamental resonance frequency is increased due to repulsive interactions with the surface. When the probe is in permanent contact with the sample, there is no oscillation. The Z-piezo displacement from the onset of intermittent contact to permanent contact represents the free amplitude of vibration of the tip.

According to an embodiment, the force curve is an important measurement because it provides the necessary information needed to select the appropriate setpoint amplitude for the feedback loop to acquire AFM images. The setpoint amplitude value should be lower than the free vibration amplitude to ensure that the tip interacts with the atomic forces on the surface but not too low for the tip to crash into the sample.

According to an embodiment, in order to obtain an AFM image, an algorithm-implemented PID controller is used to keep constant the output amplitude signal equal to the setpoint. This can be achieved by modulating the Z-piezo as the tip scans the sample. The recorded Z-piezo displacement values are post-processed to generate the surface topography.

According to an embodiment, the MiT-SPM is able to perform sequential atomic imaging and nanoprobing in both ambient air and vacuum conditions. In STM/AFM-nanoprobing mode, an STM/AFM image is first acquired and this image is used as feedback to position the MiT probe at a particular location on the sample for nanoprobing measurement or surface conductance mapping. Accordingly, the STM/AFM-nanoprobing mode is a very powerful technique for doing nanoscale electrical probing without the use of an SEM.

Figure 13:
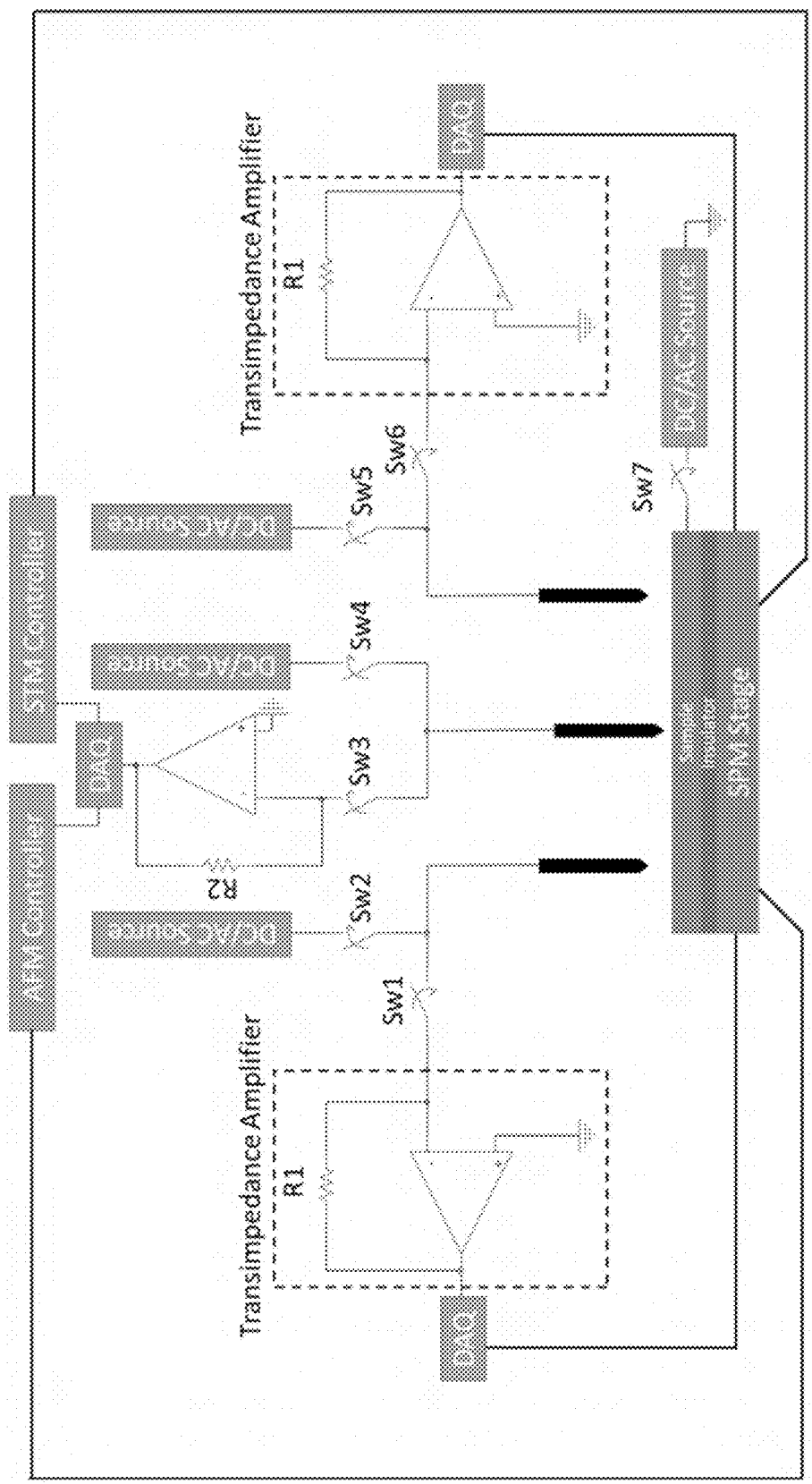
FIG. 13 is a schematic representation of the electrical connections in an MiT-SPM, in accordance with an embodiment.

Referring now to FIG. 13 is a schematic of the electrical connections of a MiT-SPM in accordance with an embodiment. These connections allow for AFM, STM, and Nanoprobing operation of the MiT-SPM. The tips are connected through a series of relays/switches (Sw1-Sw6) to the transimpedance amplifiers, DC/AC signal sources, data acquisition modules (DAQ), AFM and STM controllers. The sample is biased by connecting a DC/AC signal source through switch (Sw7).

Alignment:
During alignment routines, all the switches are open but Sw1, Sw6, and Sw7 are closed. The transimpedance amplifiers have a feedback resistor (R1 and R2) and present a virtual ground to the tips. The sample is biased with a DC/AC signal source. The tunneling current from the side tips are converted into tunneling voltage by the transimpedance amplifier and fed into the DAQ. The DAQ uses these tunneling voltages to decide which direction to rotate the MiT Scanning Probe head.

STM Mode:
After alignment of the tips, the middle tip is used for either STM or AFM analysis. For STM operation, all the switches are open but Sw3 and Sw7 are closed. The tunneling current through the middle tip is converted into voltage by the feedback resistor R2. The DAQ records and manipulates the voltage signal and sends commands to the STM controller. The STM controller then instructs the microscope to perform either constant current or constant height scanning of the sample.

AFM Mode:
In AFM operation, the integrated tips are aligned to the sample surface and the middle tip is excited in resonance. All the switches are open but Sw3 is closed. The motional current through the middle tip is converted into a motional voltage by the feedback resistor R2. The motional voltage is recorded by the DAQ and manipulated. The manipulated signal is sent to the AFM controller which determines changes in vibrational frequency, amplitude and phase. The AFM controller then sends command signals to the SPM stage to allow for various AFM measuring modes such as contact mode and tapping mode.

Nanoprobing Mode:
After the alignment of the tips to the surface of the sample, all the switches are opened but Sw2, Sw4, and Sw5 are closed. The tips are brought in direct contact or in proximity with the sample. With the sample electrically floating, trans-conductance measurements between the tips can be investigated. In certain applications, the sample switch Sw7 can be closed and this would allow for back-biasing the sample.

Figure 14:
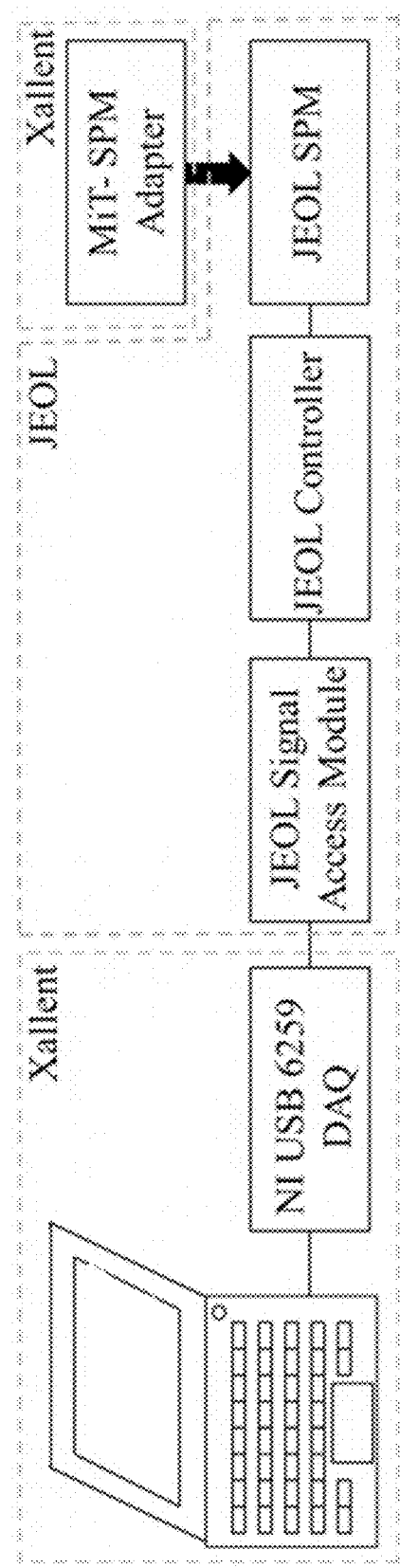
FIG. 14 is a schematic representation of an MiT-SPM without an integrated sample stage, in accordance with an embodiment.

Referring to FIG. 13, an embodiment of an MiT-SPM without an integrated sample stage is provided. According to an embodiment, the MiT-SPM Adapter (MiT-SPM without the sample stage) can be mounted into existing single tip SPMs to leverage the sample stage in these microscopes. The adapter consists of all the components shown in FIG. 1, but without the sample stage. According to an embodiment as shown in FIG. 14, the MiT-SPM Adapter can be integrated to a commercially-available single tip SPM, such as the JEOL SPM. According to this embodiment, the NI USB 6259 is the hardware that would send instructions to the JEOL SPM, and the MiT-SPM Adapter is mounted on top of the sample stage of the JEOL SPM. Many other configurations are possible.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The above-described embodiments of the described subject matter can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single device or computer or distributed among multiple devices/computers.

What is claimed is:

1. A method of aligning at least two probe tips in a scanning probe adapter, the method comprising the steps of:
   providing a probe head comprising at least two probe tips;
   moving the sample and the at least two probe tips into proximity;
   capturing, using an optical microscope, an image of the at least two probe tips and a corresponding reflection of the at least two probe tips;
   tracking, using an image recognition algorithm, an outer line shape of the at least two probe tips and the corresponding reflections;
   calculating a distance between an apex each of the at least two probe tips and the apex of the corresponding reflection;
   comparing the calculated distances to determine which, if any, of the at least two probe tips had a shorter calculated distance; and
   if one of the at least two probe tips had a shorter calculated distance, rotating the probe head away from whichever of the at least two probe tips had the shorter calculated distance, or determining that the at least two probe tips are aligned if equivalent distances are calculated for each of the at least two probe tips.

2. The method of claim 1, further comprising the step of repeating the method until equivalent distances are calculated from the at least two probe tips.

* * * * *